No. 747,606. PATENTED DEC. 22, 1903.
A. HILDEBRANDT.
POULTRY HANGER.
APPLICATION FILED MAR. 11, 1901.
NO MODEL.
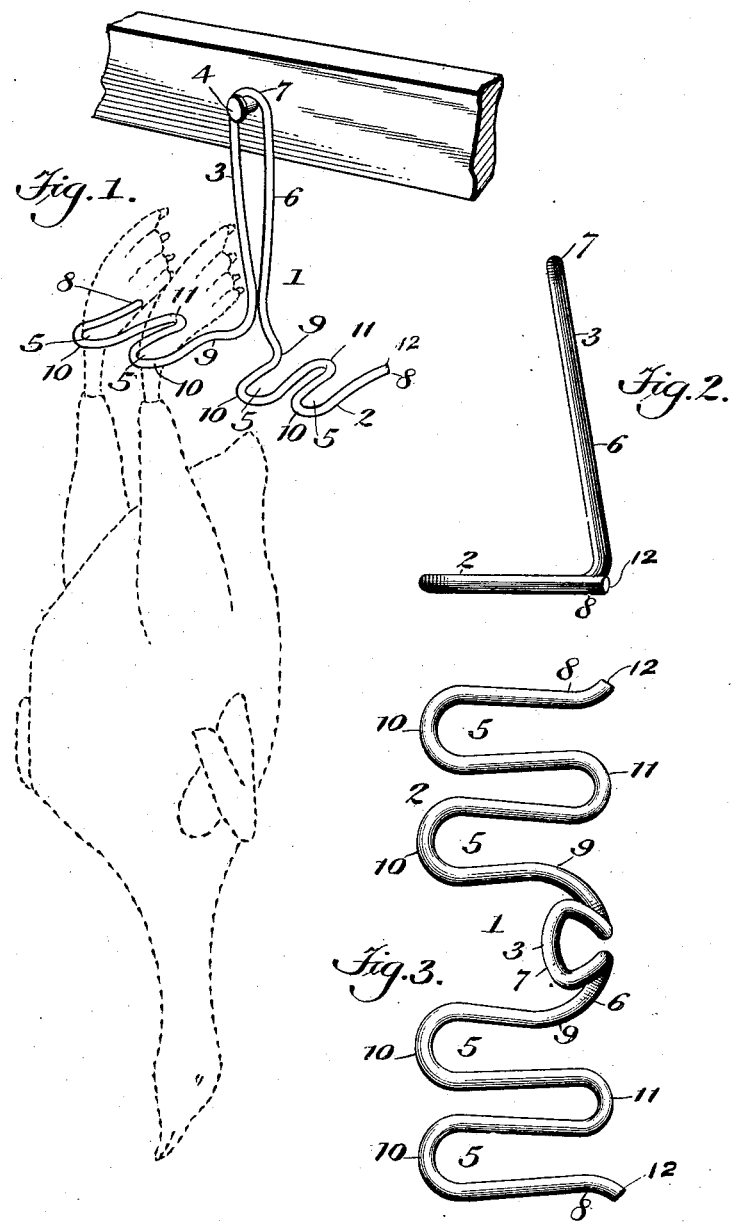

No. 747,606. Patented December 22, 1903.

UNITED STATES PATENT OFFICE.

ADOLPH HILDEBRANDT, OF NEW YORK, N. Y.

POULTRY-HANGER.

SPECIFICATION forming part of Letters Patent No. 747,606, dated December 22, 1903.

Application filed March 11, 1901. Serial No. 50,568. (No model.)

*To all whom it may concern:*

Be it known that I, ADOLPH HILDEBRANDT, a subject of the Emperor of Germany, residing at New York, in the county and State of New York, have invented certain new and useful Improvements in Poultry-Hangers, of which the following is a specification.

This invention relates to poultry-hangers; and it has for its object to provide an improved device of this class whereby poultry may be conveniently hung in market, cold storage, or elsewhere and which shall obviate the necessity of tying the legs of the bird before hanging, as is now customary.

In the drawings, Figure 1 is a perspective view of my improved poultry-hanger, illustrating the same in use. Fig. 2 is a detail side view of the hanger. Fig. 3 is a detail top plan view of the same.

Corresponding parts in all the figures are denoted by the same reference characters.

Referring to the drawings, 1 designates my improved poultry-hanger, which consists of a body member 2, with which the bird is directly connected, and a suspension member 3, whereby the body member may be suspended from a hook, nail, or other support, as at 4.

The body member 2 in the preferred form of construction embodies a plurality of clamping members 5, between which the legs of the bird are gripped to firmly support the same. The body member 2 extends in a horizontal plane, and the suspension member 3 extends in a vertical plane and projects centrally from the body member, whereby the weight of the suspended poultry is evenly maintained.

The hanger 1 consists in the preferred form of construction of a single length of stiff spring-wire 6, which is looped centrally, as at 7, to form the suspension member 3, and the end portions 8 of which are formed into the body member 2, being oppositely laterally directed from the lower end of the central looped portion. In forming the body member 2 each of the end portions 8 of the wire is bent outwardly and forwardly from the base of the suspension member, as at 9, and is formed into two broad open loops 10, which are connected by a narrow or contracted loop 11, which is reversely arranged with respect to the loops 10. The extreme end 12 of each of the end portions 8 terminates substantially in the vertical plane of the central looped portion 7 of the wire. The outer sides of the loops 10 and the combined inner sides of the loops 10 and the sides of the loops 11, into which each of the end portions is formed, constitute the clamping members 5. It will be noted that the body member 2 consists of two parts, which are arranged side by side and laterally of the suspension member, which projects vertically between the same, and that the body member is arranged forwardly of the plane of the suspension member. The loops 10 taper in form toward their open sides, as illustrated, whereby the legs of the birds may be more effectually retained within the same.

Each leg of the fowl may occupy a separate loop or both may be held by the same member, and they may be inserted therein either from the rear or front, according as the hanger is suspended from a nail or hook, or in the hand of the user at the time, it being seen that although the loops do not extend rearwardly past the vertical plane of the suspension-loop the returned bends of the wire present loops with contracted openings at both front and rear.

The operation and advantages of my improved poultry-hanger will be readily understood. The leg or legs of the chicken, turkey, goose, or other poultry may be readily passed between the clamping members 5, which, due to their spring-wire construction, will give or yield slightly and bind positively upon the legs to support the bird. The relatively greater size of the feet of the bird will prevent the bird from falling, due to the slipping of the legs between the clamping members. The arrangement of the body member 2 laterally of the suspension member and at both sides of the same, as well as forwardly of the suspension member, permits of hanging the device flat against a wall or other support for the convenient suspension of the poultry.

It will be noted that a number of birds may be accommodated by one of the improved hangers by bunching the legs between the clamping members, or a single bird may be suspended from the same by spreading the legs and connecting them, respectively, with opposite ends of the body member. The suspension of poultry by means of the abovedescribed improved hangers obviates all necessity of tying the legs together, as is now customary.

The entire device is simple in construction and inexpensive in manufacture and may be readily connected with and detached from the poultry in use.

Having thus described my invention, I claim and desire to secure by Letters Patent—

The poultry-hanger herein described, comprising a piece of spring-wire bent at its middle to form an upwardly-extending suspension-loop and at either side of said loop bent forward and backward alternately, in a single plane nearly at right angles to said loop, to form a plurality of open holding-loops having slightly-contracted mouths, and with their rear ends terminating in a line in the plane of the suspension-loop, whereby the holding-loop may be sprung open to receive and retain the legs of the fowl, and the hanger may be caused when suspended to lie close against a vertical support.

In testimony whereof I have signed my name in the presence of the subscribing witnesses.

ADOLPH HILDEBRANDT.

Witnesses:
GEO. VAIL HUPPERTZ,
J. R. LITTELL.